US011864579B2

(12) United States Patent
Inagaki

(10) Patent No.: US 11,864,579 B2
(45) Date of Patent: Jan. 9, 2024

(54) FLAVOR INHALER

(71) Applicant: JAPAN TOBACCO INC., Tokyo (JP)

(72) Inventor: Michihiro Inagaki, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 17/527,454

(22) Filed: Nov. 16, 2021

(65) Prior Publication Data

US 2022/0071271 A1 Mar. 10, 2022

Related U.S. Application Data

(63) Continuation of application No. 16/381,760, filed on Apr. 11, 2019, now Pat. No. 11,202,465, which is a continuation of application No. PCT/JP2016/080265, filed on Oct. 12, 2016.

(51) Int. Cl.

| | |
|---|---|
| ***A24B 15/167*** | (2020.01) |
| ***H05F 3/06*** | (2006.01) |
| ***A24B 15/32*** | (2006.01) |
| ***A24F 40/40*** | (2020.01) |
| ***A24B 15/40*** | (2006.01) |
| ***A24F 40/05*** | (2020.01) |
| ***A24F 40/10*** | (2020.01) |

(52) U.S. Cl.

CPC ............ *A24B 15/167* (2016.11); *A24B 15/32* (2013.01); *A24B 15/403* (2013.01); *A24B 15/406* (2013.01); *A24F 40/05* (2020.01); *A24F 40/40* (2020.01); *H05F 3/06* (2013.01); *A24F 40/10* (2020.01)

(58) Field of Classification Search

None

See application file for complete search history.

(56) References Cited

U.S. PATENT DOCUMENTS

| | | | |
|---|---|---|---|
| 2004/0016427 | A1 | 1/2004 | Byron et al. |
| 2005/0067503 | A1 | 3/2005 | Katase |
| 2008/0130189 | A1 | 6/2008 | Kobayashi et al. |
| 2009/0133691 | A1 | 5/2009 | Yamada et al. |
| 2011/0174304 | A1 | 7/2011 | Triplett, II et al. |
| 2011/0275982 | A1 | 11/2011 | Ikemoto et al. |
| 2014/0096782 | A1 | 4/2014 | Ampolini et al. |
| 2015/0047662 | A1 | 2/2015 | Hopps |

(Continued)

FOREIGN PATENT DOCUMENTS

| | | | |
|---|---|---|---|
| CN | 104254258 | A | 12/2014 |
| CN | 104432538 | A | 3/2015 |

(Continued)

OTHER PUBLICATIONS

Extended European Search Report for corresponding European Application No. 21192096.2, dated Feb. 24, 2022.

(Continued)

*Primary Examiner* — Dennis R Cordray

(74) *Attorney, Agent, or Firm* — Birch, Stewart, Kolasch & Birch, LLP

(57) ABSTRACT

A flavor inhaler includes a control unit configured to control operation of the flavor inhaler; a main switch electrically connected to an input side of the control unit, the main switch configured to send a signal to the control unit to start operation of the control unit; and a sub switch electrically connected to the control unit, the sub switch configured to send a signal to the control unit to start supplying liquid from a liquid holding unit accommodating an aerosol base.

15 Claims, 10 Drawing Sheets

(56) References Cited

U.S. PATENT DOCUMENTS

| | | | |
|---|---|---|---|
| 2016/0081395 | A1 | 3/2016 | Thorens et al. |
| 2016/0331026 | A1 | 11/2016 | Cameron |

FOREIGN PATENT DOCUMENTS

| | | | |
|---|---|---|---|
| EP | 1733798 | A1 | 12/2006 |
| EP | 2388040 | A1 | 11/2011 |
| GB | 2334461 | A | 8/1999 |
| JP | 2006-122819 | A | 5/2006 |
| JP | 4329672 | B2 | 9/2009 |
| JP | 5041550 | B2 | 10/2012 |
| JP | 5498960 | B2 | 5/2014 |
| JP | 2015-511495 | A | 4/2015 |
| JP | 2015-513970 | A | 5/2015 |
| JP | 2016-519937 | A | 7/2016 |
| WO | WO 94/19042 | A1 | 9/1994 |
| WO | WO 00/64590 | A1 | 11/2000 |
| WO | WO 2005/097339 | A1 | 10/2005 |
| WO | WO 2010/082543 | A1 | 7/2010 |
| WO | WO 2013/152873 | A1 | 10/2013 |
| WO | WO 2014/187770 | A2 | 11/2014 |
| WO | WO 2016/075436 | A1 | 5/2016 |

OTHER PUBLICATIONS

Extended European Search Report for corresponding European Application No. 21204223.8, dated Feb. 24, 2022.

Eurasian Office Action for Eurasian Application No. 201990802, dated Oct. 16, 2020, with English translation.

Extended European Search Report, dated May 4, 2020, for European Application No. 16918679.8.

Hagena, "Cluster ion sources (invited)," Review of Scientific Instruments, vol. 63, No. 4, Apr. 1992, pp. 2374-2379.

Hagena, "Nucleation and Growth of Clusters in Expanding Nozzle Flows," Surface Science, vol. 106, 1981, pp. 101-116.

International Search Report, issued in PCT/JP2016/080265, PCT/ISA/210, dated Dec. 20, 2016.

Taiwanese Office Action and Search Report dated Apr. 19, 2019 for corresponding Taiwanese Application No. 106126238, with English translation.

FLAVOR INHALER

CROSS-REFERENCE TO RELATED APPLICATIONS

This application is a Continuation Application of U.S. application Ser. No. 16/381,760, filed Apr. 11, 2019, which is a Continuation Application of PCT Application No. PCT/JP2016/080265 filed Oct. 12, 2016. The entire contents of each of the above-identified applications are incorporated herein by reference.

BACKGROUND OF THE INVENTION

1. Field of the Invention

The embodiments described herein relate generally to a flavor inhaler comprising non-heating and non-combustion type atomizing means.

2. Description of the Related Art

Conventionally, a non-combustion type flavor inhaler for inhaling flavor without combustion is known. The non-combustion type flavor inhaler has an aerosol base for generating aerosol and an atomization means for atomizing the aerosol base without combustion. Various atomizing means for atomizing the aerosol base are known, and the most common atomizing means is a heating type non-combustion flavor inhaler which has a heat source for heating the aerosol base and a power supply for supplying electric power to the heat source (see JP 2015-511495 A). In a heating type non-combustion flavor inhaler, however, a high-output, large-capacity battery is necessary and needs to be charged frequently since a large current is supplied in a short time to heat. In addition, there is also a restriction that mainly volatile components can be discharged. In addition, a problem also arises that thermal decomposition products are generated by heating.

BRIEF SUMMARY OF THE INVENTION

An embodiment of the present invention provide a flavor inhaler comprising non-heating, non-combustion type atomizing means, in which thermal decomposition products generated by heating is no or is suppressed, and both a volatile component and a nonvolatile component can be discharged stably with low electric power.

According to an aspect of the present invention, there is provided a non-heating, non-combustion type flavor inhaler including: a supply flow path unit comprising a first flow path leading aerosol toward a user side and a suction port for inhaling the aerosol by the user; a liquid holding unit accommodating an aerosol base which is a material of the aerosol; a second flow path having one end communicating with the liquid holding unit and the other end which is located in the supply flow path unit and is opened toward the suction port side, and having a conductive portion on the other end side; a liquid feeding system feeding the aerosol base accommodated in the liquid holding unit from the one end side to the other end side; a power supply and a control unit applying a voltage to the conductive portion, to atomize the aerosol base and to eject the aerosol from an opening of the other end; and a static elimination unit neutralizing charge of the aerosol ejected from the opening.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
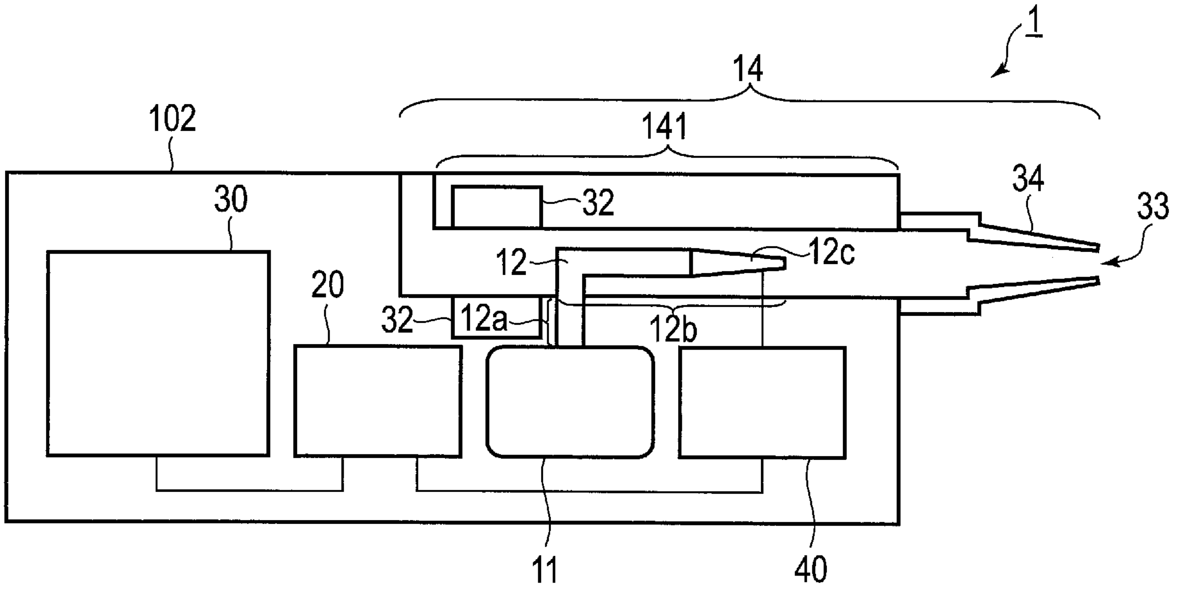
FIG. 1 is a schematically cross-sectional view illustrating an example of a configuration of a flavor inhaler according to a first embodiment.

Embodiments will be described hereinafter with reference to the accompanying drawings. The same or similar structures are denoted by the same reference numerals throughout the specification, and duplicated explanations are omitted. In addition, each figure is a schematic diagram for promoting understanding of the embodiment, and its shape, dimensions, ratio, and the like are different from the actual parts. In addition, in the present specification, the terms "upstream" and "downstream" are appropriately used, the terms is based on the direction of a flow of aerosol generated in the flavor inhaler when used.

A flavor inhaler of the present invention comprises a supply flow path unit comprising a first flow path leading aerosol toward a user side and a suction port for inhaling the aerosol by the user; a liquid holding unit accommodating an aerosol base which is a material of the aerosol; a second flow path having one end communicating with the liquid holding unit and the other end which is located in the supply flow path unit and is opened toward the suction port side, and having a conductive portion on the other end side; a liquid feeding system feeding the aerosol base accommodated in the liquid holding unit from the one end side to the other end side; a power supply and a control unit applying a voltage to the conductive portion, to atomize the aerosol base and to eject the aerosol from an opening of the other end; and a static elimination unit neutralizing charge of the aerosol ejected from the opening. Such a flavor inhaler is a non-heating and non-combustion type and comprises at least one aerosol generation system configured to atomize aerosol base by voltage application. In such a configuration, thermal decomposition products generated by heating is no or is suppressed, and both a volatile component and a nonvolatile component can be discharged stably with low electric power. In one exemplary aspect, the second flow path is a liquid flow path. The degree of neutralization of charge of the aerosol by the static elimination unit may be adjusted as desired, and the charge of, for example, half, one third or one quarter quantity as compared with an uneliminated state may be eliminated or, alternatively, no charge state of the aerosol may be achieved by the static elimination.

The aerosol base may be a substance having conductivity. The aerosol base may be, for example, an aqueous solution containing conductive ions. The aerosol base can further comprise a flavor component. The flavor component can be a volatile component or a nonvolatile component or a combination thereof.

The volatile component may be a component commonly used as a perfume such as menthol, limonene, linalool, vanillin, etc., a component derived from a natural product, a plant-derived component or a synthetic component, or a combination thereof.

The nonvolatile component may be a component contributing to taste and/or somatic sensation such as a saccharide such as glucose, fructose, sucrose and lactose, a bitter substance such as tannin, catechin and naringin, an acid such as malic acid and citric acid, or a combination thereof, but is not limited thereto. In addition, the flavor component may be emulsified and suspended by an emulsifier or a dispersant. "Flavor" may be a substance which provides either aroma or taste, or both aroma and taste.

The voltage applied to the conductive portion for atomizing the aerosol base is desirably 1 to 20 kV, and a booster circuit can be arranged to obtain such a voltage. It is preferable that the maximum current when a voltage is applied to the conductive portion is controlled to be 200 μA or less. In such a configuration, the user does not feel stimulation like a pain or an electric shock. As such a configuration, for example, a configuration disclosed in WO 2010/082543 can also be used.

FIG. 1 is a schematically cross-sectional view showing an example of the configuration of the flavor inhaler according to the first embodiment. A flavor inhaler 1 comprises a liquid holding unit 11, a liquid flow path 12, a supply flow path unit 14, a power supply 30, a control unit 20, and a static elimination unit 32.

The liquid flow path 12 can be formed of a tubular member. Its one end communicates with the liquid holding unit 11, and the other end is located in the supply flow path unit 14 and is opened toward a suction port 34 side. A region of the one end side of the liquid flow path 12 is a first region 12*a* and a region of the other end side located in the supply flow path unit 14 is a second region 12*b*.

In the flavor inhaler 1, the liquid aerosol base accommodated in the liquid holding unit 11 is fed from the first region 12*a* to the second region 12*b* of the liquid flow path 12. The liquid flow path 12 includes a conductive portion 12*c* as at least a part of the second region 12*b*, and a voltage is applied to this portion. Thereby the aerosol base is atomized at the opening end of the second region 12*b* and is ejected. In this way, the aerosol is thus formed.

For example, the conductive portion 12*c* includes a conductive member on at least a part of a wall portion defining the second region 12*b* of the liquid flow path 12. For example, the conductive member may be arranged from the outer surface to the inner surface in a thickness direction of the wall portion of the second region 12*b* of the liquid flow path 12. For example, the conductive portion 12*c* may be a rectangular piece fitted as a part of the wall portion of the second region 12*b* of the liquid flow path 12, or may be an annular body along a circumferential surface or outer surface of the liquid flow path 12 around the axis, or may be an annular body or a hollow conical cap having a through hole at the tip, which is configured to be fitted onto the tip or near the tip of the opening of the liquid flow path 12. In addition, for example, an entire body of the second region 12*b* of the liquid flow path 12 may be formed of a conductive member. Furthermore, for example, the entire body of the first region 12*a* and the second region 12*b* may be formed of a conductive member. In this case, for example, the voltage application may be performed by connecting a high voltage line to the first region 12*a*. For example, such a configuration is desirable since the high voltage line is not exposed in the supply flow path unit 14.

The aerosol atomized and ejected in the supply flow path unit 14 is fed to the suction port side of the supply flow path unit 14 and is discharged from the suction port 34 to the user side.

Voltage application to the conductive portion 12*c* can be performed by electric power from the power supply 30. Voltage adjustment may be performed by the voltage adjustment circuit 40, for example, may be performed by boosting. The voltage adjustment circuit may be a booster circuit.

The power supply 30 may be a battery, for example, a primary battery of manganese, alkali, oxyride, nickel, nickel manganese, lithium or the like, or a secondary battery such as a nickel cadmium battery, a nickel metal hydride battery, a lithium battery or the like.

The aerosol formed by applying the voltage to the second region 12*b* of the liquid flow path 12 is charged state in accordance with the magnitude of the applied voltage and the conductivity of the aerosol base. The static elimination unit 32 eliminates the charge of the aerosol. For example, static elimination of the aerosol can be performed by a pair of electrodes. For example, the static elimination unit may comprise a discharge electrode for applying a high voltage which is opposite in polarity to the voltage applied to the second region 12*b*, and a counter-electrode disposed opposite to the discharge electrode. A mechanism for charging moisture or the like in the outside air by applying a high voltage between both of the electrodes can be used as the static elimination unit 32. The static elimination means may be means for cooling the discharge electrode to condense moisture in the air on the electrode portion, and emitting the water by charging the water, as disclosed in JP 4329672 B, may be used or other commonly known static elimination means may be used instead. Since the charged water is opposite in polarity of charges to the atomized and ejected aerosol, both of them can be combined and the charge of the aerosol particles can be reduced or eliminated. This is advantageous with respect to a feature that deposition of the atomized and ejected aerosol particles inside the device can be suppressed. The static elimination unit may comprise at least a pair of electrodes. For example, the static elimination unit may be a pair of electrodes or plural pairs of electrodes.

The aerosol base accommodated in the liquid holding unit 11 passes through the communicating portion between the liquid flow path 12 and the liquid holding unit 11, enters the first region 12*a* in the liquid flow path 12, and then moves to the second region 12*b* through the first region 12*a*. Such movement of the aerosol base may be achieved by, for example, a liquid feeding system (not shown). The liquid feeding system may be any configuration for absorbing the aerosol base from the liquid holding unit 11 to the first region 12*a*. Alternatively, the liquid feeding system may be any configuration to be pushed from the liquid holding unit 11 to the liquid flow path 12. Examples of such liquid feeding systems may be selected from, for example, feeding mechanisms such as manually or motorized syringe pumps, arrangement of the filling material which attracts the capillary phenomenon or the like, or combinations thereof, or any known liquid feeding systems may be used.

If the liquid feeding system is provided by the arrangement of the filling material, the arranged position, the arranged region, the filling amount and the filling degree of the filling materials can be arbitrarily selected. For example, the filling material may be at least a part of the region in the liquid flow path 12, at least a part of the region within the liquid holding unit 11, at least a region extending from the inside of the liquid holding unit 11 to the inside of the liquid flow path 12, or a region of combinations thereof.

The filling material may be, for example, a naturally-derived fibrous material, for example, a plant dried product, a cut product of a plant dried product, a cut product of leaf tobacco, a fruits dried product and a vegetable dried product, a cut product thereof, plant-derived fibers, for example, cotton wool, hemp fibers, plant-derived substance, and a synthetic fibrous material, or any combinations thereof. Alternatively, the filling material may be a product obtained by shaping a plant-dried product into a sheet shape and cutting it into a preferable size, for example, a cut product of a filter paper or a tobacco sheet, or the like.

This filling material feeds the aerosol base by the capillary phenomenon. Therefore, the supply of the aerosol base in the flavor inhaler can be partially performed by the capillary phenomenon. Alternatively, for example, extrusion of a liquid by a syringe pump may be performed manually according to the user's desire, and the other liquid feeding may be performed by the capillary phenomenon. Alternatively, the liquid may be fed by the capillary phenomenon until the amount of the aerosol base decreases to a predetermined amount, and then the liquid may be fed by a syringe pump when the amount reaches a predetermined amount or less. Alternatively, the capillary phenomenon and feeding the liquid by a syringe pump may be constantly used together according to a routine determined in advance under the control of the control unit 20.

Furthermore, the flavor inhaler 1 may comprise a housing 102 which accommodates the liquid holding unit 11, the liquid flow path 12, the supply flow path unit 14, the power supply 30, and the static elimination unit 32. The housing 102 may comprise an opening portion opened to the user side, and the supply flow path unit 14 may protrude from the opening portion, and suction port 34 may be composed at a tip thereof. The suction port 34 may be a mouthpiece attached to the opening portion.

For example, the supply flow path unit 14 comprises a supply flow path 141 which feeds the aerosol ejected from the second region 12*b* of the liquid flow path 12 to the user side. The end of this flow path of the user side is opened, and the suction port 34 is provided at this end. An end portion 33 of the suction port 34 on the user side is opened. In the supply flow path unit 14, an air inlet to take in the outside air may be opened on the upstream side, besides the suction port 34. Such the opening can be provided at an arbitrary position on the outer peripheral portion of the housing 102 or the outer peripheral portion of the suction port 34. An air inlet to take in the outside air may not necessarily be provided. In that case, for example, the user may inhale the aerosol flowing out from the suction port together with the outside air without holding the suction port in the mouth.

In the flavor inhaler 1, at least one component or a combination of components may be the cartridge type and may be detachable, which selected from the liquid holding unit 11, the liquid flow path 12, the supply flow path unit 14, the power source 30 and the static elimination unit 32, and the member for connecting them to each other and the like.

The flavor inhaler 1 further comprises a control unit 20. The flavor inhaler 1 can be operated by the electric power from the power supply 30 under the control of the control unit 20. The control by the control unit 20 may be designed as desired. In addition, in the control by the control unit 20, information from a desired sensor arranged in association with each component can be used as desired.

The flavor inhaler 1 may comprise a main switch for starting the operation of the control unit 20 and may further comprise a further sub switch for starting the liquid supply from the liquid holding unit 11. The control unit 20 may maintain a standby state of the flavor inhaler 1 by the minimum power from the power source 30 until the main switch is turned on. In this case, when the user turns on the main switch, the control unit 20 having received the signal can start supplying power from the power supply 30 to each of the components of the flavor inhaler 1. Alternatively, by turning on the main switch, they may be received the minimum power from the power supply 30.

Each of the operations successively performed in the flavor inhaler 1 may be started by the control unit sensing with a predetermined sensor for detecting an arbitrary operation. For example, the flavor inhaler 1 may further comprise a suction detection sensor (not shown) for detecting the flow of the outside air taken in from the air inlet, and a remaining amount sensor (not shown) for sensing the remaining amount of the aerosol base accommodated in the liquid holding unit 11. If any one of the components of the flavor inhaler 1 is the cartridge type, the flavor inhaler 1 may comprise a cartridge detection sensor for sensing the cartridge present at a predetermined part or normally set.

As shown in FIG. 1, in the above example, the flavor inhaler 1 comprises the housing 102 which accommodates the liquid holding unit 11, the liquid flow path 12, the supply flow path unit 14, the power supply 30, the control unit 20, and the static elimination unit 32. However, the flavor inhaler 1 does not definitely need to comprise the housing 102 but, for example, these components may function as described above and may be integrated to achieve the function of the flavor inhaler according to the embodiment as a whole.

Figure 2:
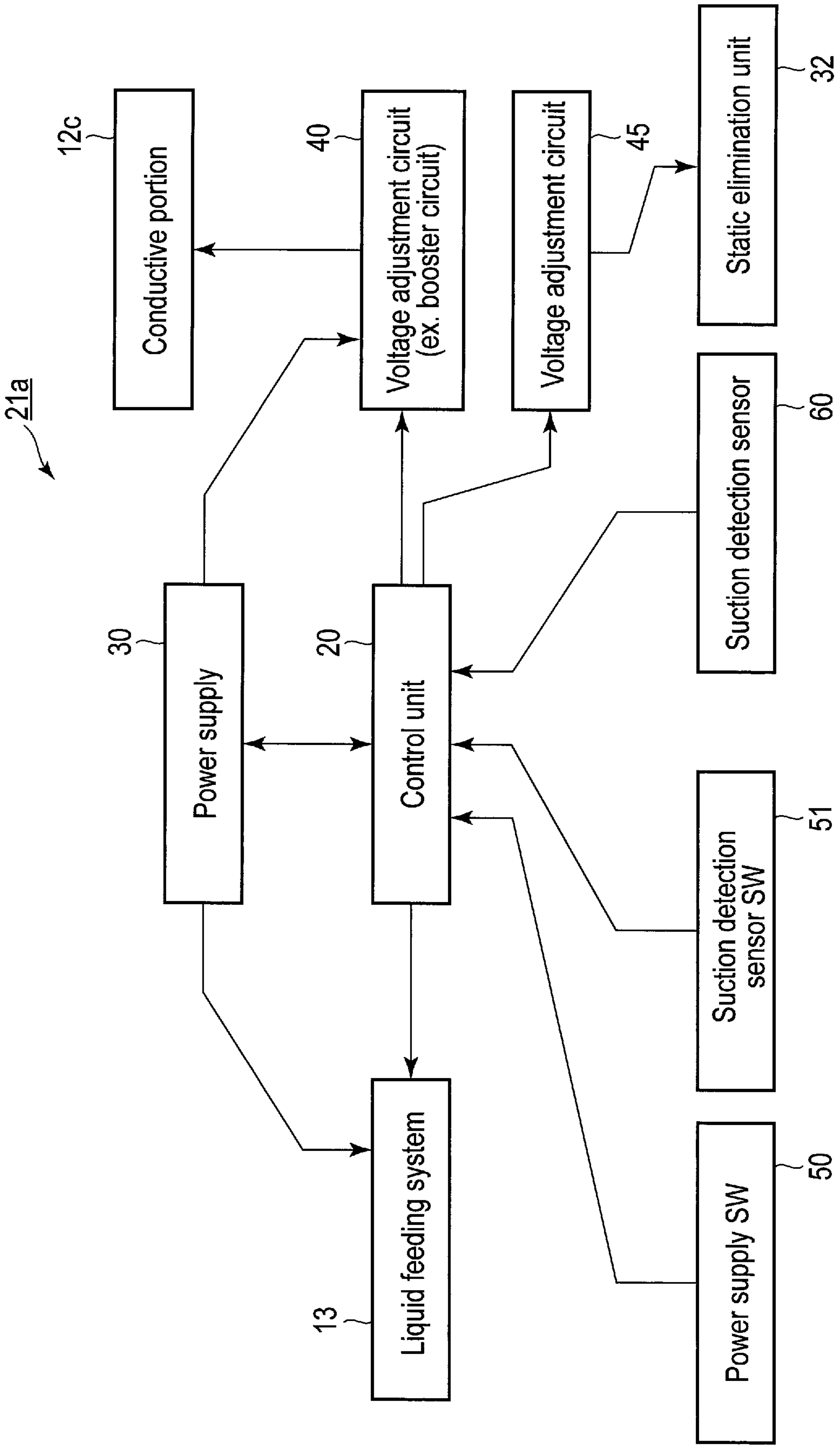
FIG. 2 is a block diagram illustrating an example of a configuration of a control system in the flavor inhaler according to the first embodiment.

FIG. 2 shows an example of a control system of the flavor inhaler 1. The control system 21*a* may include a control unit 20, a voltage adjustment circuit 40 (also known as a first voltage adjustment circuit) connected to the conductive portion 12*c*, and a voltage adjustment circuit 45 (also known as a second voltage adjustment circuit) connected to the static elimination unit 32. The control unit 20 comprises, for example, a microprocessor and a memory, peripheral equipment, an input/output interface, and the like.

The components of the flavor inhaler 1 to be controlled by the control unit 20, for example, the power supply 30, the liquid feeding system 13, the voltage adjustment circuits 40 and 45, the display unit (not shown) and the like are electrically connected to the output side of the control unit 20. Furthermore, the conductive portion 12*c* and the static elimination unit 32 are electrically connected to the output sides of the voltage adjustment circuits 40 and 45, respectively.

To transmit information required for control performed by the control unit 20 to the control unit components issuing information or a signal, for example, a main switch such as a power switch 50, a sub switch such as a suction detection sensor switch 51 (suction detection sensor SW in the drawing), sensors such as a suction detection sensor 60, a temperature sensor (not shown), a cartridge detection sensor (not shown) and the like, are electrically connected to the input side of the control unit 20.

For example, the flavor inhaler 1 is out of the standby state when the power switch 50 is set to ON by the user. In this state, the suction detection sensor detects suction from the user side through the suction port 34, if desired, and the control unit 20 which receives the signal activates the voltage adjustment circuit 40 to apply a predetermined voltage to the conductive portion 12*c* of the liquid flow path 12. Next, the aerosol base in the liquid holding unit 11 is fed from the first region 12*a* to the second region 12*b*. As a result, aerosol is formed from the aerosol base. The formed aerosol is subjected to static elimination by combining with the charged substance, which is generated by the static elimination unit 32 and is opposite in polarity. The aerosol subjected to static elimination is sucked from the suction port 34 in accordance with the user's suction. A voltage may be applied to the discharge electrode and the counter electrode of the static elimination unit at the timing when the power switch 50 is set to ON, or a voltage may be applied at the timing when the suction detecting sensor 60 detects the suction.

Figure 3:
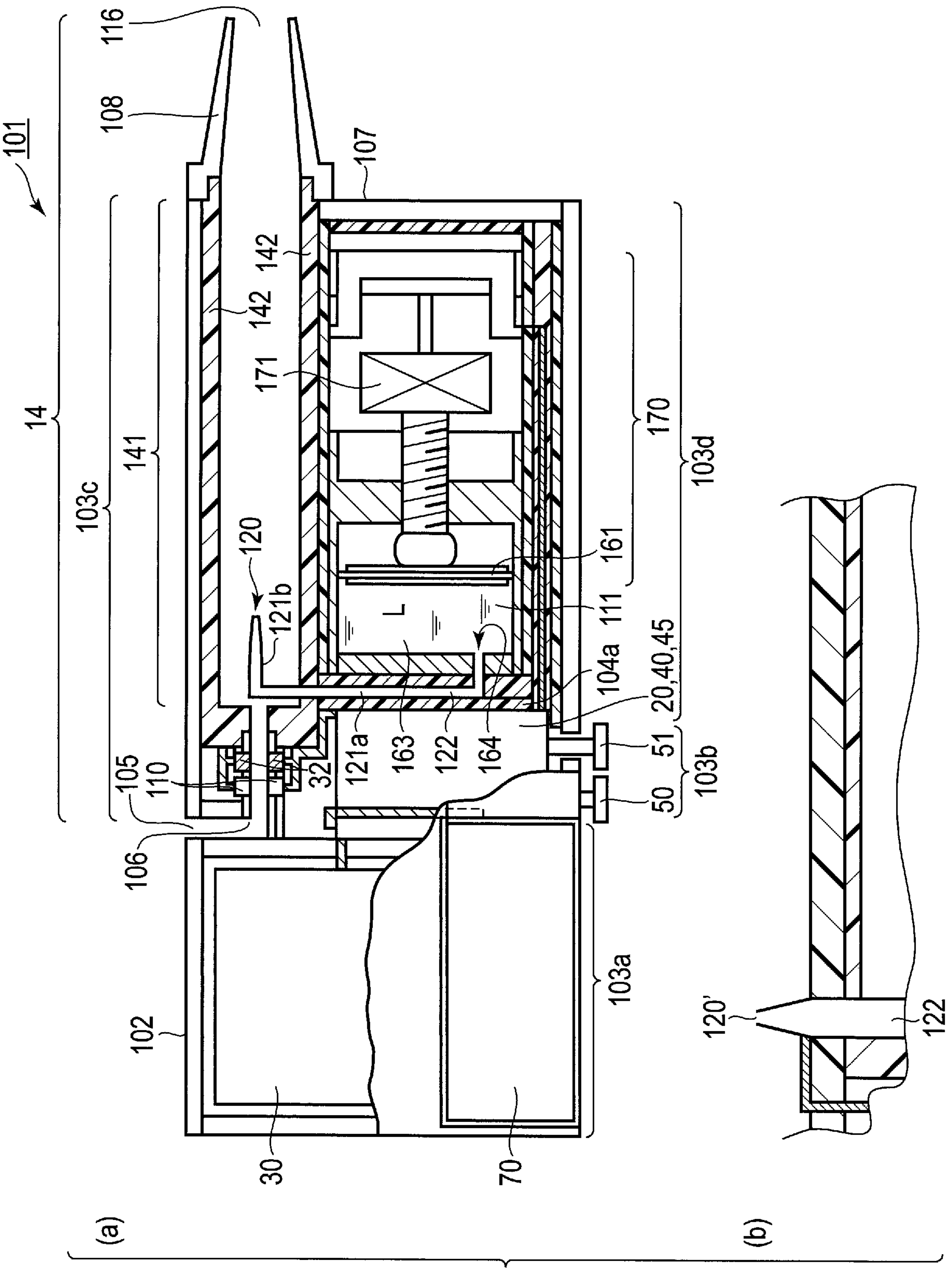
FIG. 3 is a schematically cross-sectional view illustrating an example of a configuration of a flavor inhaler according to a second embodiment.

FIG. 3(*a*) is a partial cross-sectional view of a flavor inhaler 101 according to a second embodiment. The flavor inhaler 101 comprises a housing 102 shaped in a hollow cuboid as a casing. The housing 102 comprises, for example, four casing portions, for example, a front casing 103*a*, an intermediate casing 103*b*, an upper casing 103*c*, and a lower casing 103*d*.

A power supply 30 is disposed in the front casing 103*a*. In the intermediate casing 103*b*, for example, a control unit 20, voltage adjustment circuits 40 and 45, and a static elimination unit 32, which constitute the control system, are disposed. In the upper casing 103*c*, a supply flow path 141 and a second region 121*b* of a liquid flow path 122 are disposed. In the lower casing 103*d*, a liquid holding unit 111, a part of the liquid flow path 122 (i.e., a portion including a first region 121*a*) formed in wall 104*a*, and a syringe pump 170 communicating with the liquid holding unit 111 are disposed. The control system and the other configuration of the flavor inhaler 101 are in electric communication with each other as desired.

The static elimination unit 32 may be, for example, a pair of electrodes arranged at positions opposed to each other. One of the electrodes is a discharge electrode, and receives a voltage from the voltage adjustment circuit 45 and discharges toward the counter electrode which is the other electrode. As a result, in the static elimination unit 32, aerosol particles which are opposite in polarity of charges to the atomized and ejected aerosol are generated, and static elimination is performed by combining with the atomized and ejected aerosol. For example, the static elimination unit 32 may be configured to charge moisture in the air inside the supply flow path 141 to achieve static elimination of the aerosol by the charged moisture, or for example, the static elimination unit may be configured to achieve static elimination of the aerosol directly, and both of them may be accomplished.

An air inlet 105 for taking in outside air is opened on the side surface of the housing 102 on the front casing 103*a* side, which corresponds to the upper portion of the upper casing 103*c*. This air inlet 105 connects from the outside of the housing 102 to the airway 106 of the inside, and this airway 106 connects to the supply flow path 141. The supply flow path 141 is defined by an insulating wall member 142. The other end of the supply flow path 141 is opened at the end wall 107 of the housing 102 and provides an opening portion 116 to the user side. A tapered tubular mouthpiece 108 is attached to the opening of the end wall 107 of the housing 102 corresponding to the opening portion 116. The shape of the mouthpiece may be, for example, a tapered tubular shape, but is not limited thereto.

On the wall surface defining the airway 106, a suction detection sensor 110 for detecting the flow of gas passing through the airway 106 is disposed. The suction detection sensor 110 may be, for example, a flow sensor. The flow sensor may be, for example, a sensor including an orifice disposed in the flow path. Sensing the flow rate can be performed by monitoring the differential pressure across the orifice and detecting the occurrence of flow as a differential pressure. In this embodiment, the supply flow path unit 14 comprises an air inlet 105, an airway 106, a supply flow path 141, an opening portion 116, a mouthpiece 108, a suction detection sensor 110, and a static elimination unit 32.

On the upstream side in the supply flow path 141, i.e., on the airway 106 side, a second region 121*b* of the liquid flow path 122 is disposed. In this embodiment, the second region 121*b* may be an L-shaped tube member formed of a conductive material. The second region 121*b* is tapered toward the tip, and the tip is opened in the supply flow path 141. The aerosol base is atomized and ejected into the supply flow path 141 from this opening. Alternatively, the second region 121*b* of the liquid flow path 122 may be, for example, a hollow conical cap body formed of a conductive material and opened at both ends (FIG. 3(*b*)). In the case of a cap body, its tip 120' may be opened in a direction orthogonal to the axis of the supply flow path 141.

A lead wire is electrically connected to the portion of the second region 121*b* which is formed of the conductive material and the other end is directed toward a bottom of the supply flow path 141 and passes through a wall member 142 to the outside of a wall member 142 (not shown). The other end of the lead wire is connected to the voltage adjustment circuit 40. As a result, the conductive portion of the second region 121*b* is electrically connected to the voltage adjustment circuit 40 and a voltage is applied to the conductive portion of the second region 121*b* via the lead wire.

A static elimination unit 32 is disposed in the airway 106. Static elimination of the aerosol generated by voltage application to the conductive portion is thereby performed. The static elimination unit 32 has been described above.

The first region 121*a* on the other end side of the liquid flow path 122 is in communication with the chamber 163 in the liquid holding unit 111 which accommodates the aerosol base.

In this embodiment, as an example of the liquid feeding system, an example in which the syringe pump 170 is provided is shown. The syringe pump 170 comprises, for example, a wall portion 161 which extrudes the aerosol base from the liquid holding unit 111 to the liquid flow path 122, and a syringe 171 configured to function as a pump. In such a configuration, the liquid holding unit 111 and the syringe pump 170 are integrated as a cylinder block and may be configured to be detachable as a cartridge. In that case, a cartridge detection sensor (not shown) for detecting the mounting of the cylinder block may be disposed inside the lower casing 103*d*. However, the present invention is not limited to such a configuration.

A display device 70 may be disposed on the outer surface of the housing 102. The display device 70 may be, for example, a display such as a liquid crystal, an organic EL, or the like. The display device 70 is electrically connected to the control unit 20 and can display predetermined display items and display contents under the control of the control unit 20 according to signals of the control unit 20. The position at which the display device 70 is disposed may be any region outside the housing 102, and a device separate from the flavor inhaler 101 may be used as a display device by using any technique publicly known per se.

The power switch 50 and a suction detection sensor switch 51 in communication with the control unit 20 are exposed to the outside of the housing 102. The switches provided on the flavor inhaler 101 are not limited to these, but may further include other switches as desired, such as a previously determined and assigned mode changeover switch, or may be a known touch panel type switch. In addition, the position where any of the switches is arranged may be any position where it can be electrically connected to the control unit and may be selected arbitrarily.

Figure 4:
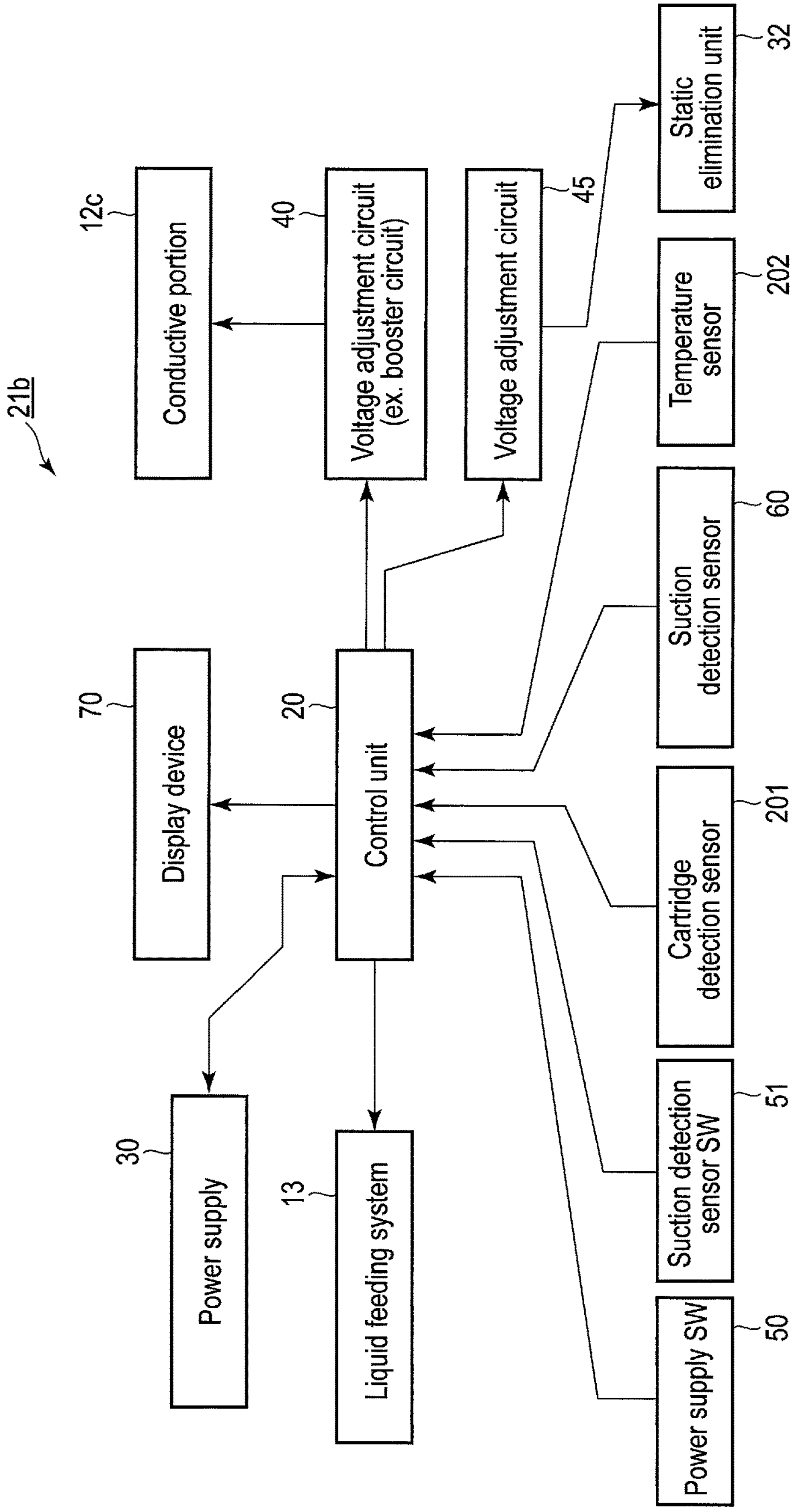
FIG. 4 is a diagram illustrating an example of a configuration of a control system in the flavor inhaler.

A control system of a second embodiment will be described with reference to FIG. 4. The control system 21*b* may have the same configuration as the control system 21*a*. In addition, the configuration of the control unit 20 has been described above. The power supply 30, the power supply switch 50, the suction detection sensor switch 51 ("suction detection sensor SW" in the drawing), a cartridge detection sensor 201, a suction detection sensor 60, and a temperature sensor 202 are electrically connected to an input side of the control unit 20. The voltage regulating circuit 40, a liquid feeding system 13, the display device 70, the power source 30, and the static elimination unit 32 are electrically connected to an output side thereof. However, the electrical connection of these configurations is not limited to this.

Figure 5:
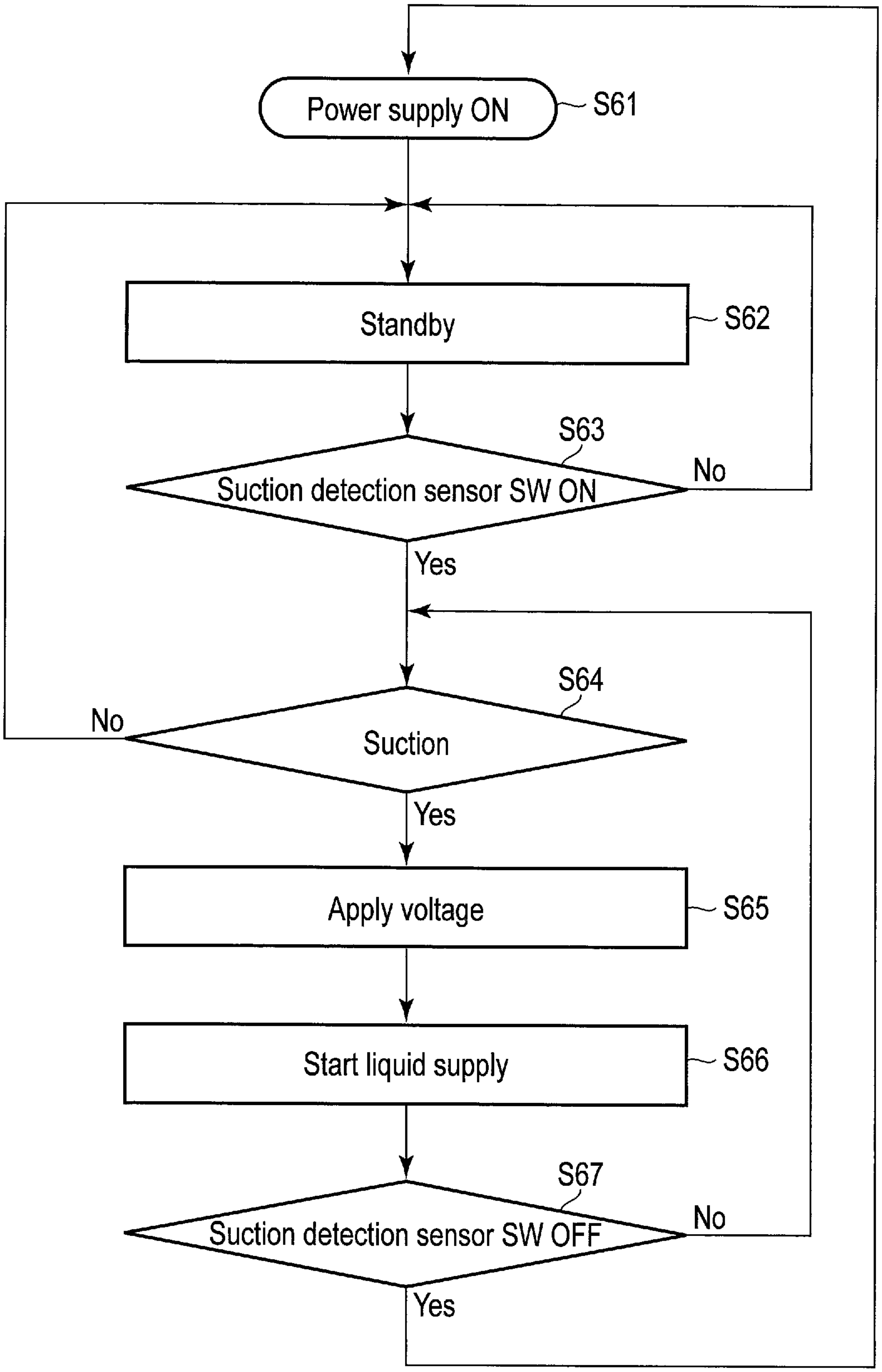
FIG. 5 is a flowchart illustrating an example of an operation of the flavor inhaler.

FIG. 5 shows an example of a series of operations performed when the flavor inhaler 101 is used. The user turns on the power (S61). As a result, electric power is supplied from the power supply 30 to the control unit 20, and the flavor inhaler 101 is set in a standby state (S62). When the user turns on the suction detection sensor switch 51, this signal is sent to the control unit 20, and the control unit 20 activates the suction detection sensor 60. When the suction detection sensor detects suction (S64), the voltage adjustment circuit 40 applies a voltage to the conductive portion (S65). Along with this, the control unit 20 or the aerosol generating circuit feeds the aerosol base from the liquid holding unit 111 in the direction from the first region 121*a* to the second region 121*b* of the liquid flow path 122 (S66). As a result, the aerosol base near the conductive portion of the second region is atomized, and the atomized aerosol base is ejected into the supply flow path 141. The ejected aerosol base is subjected to static elimination by the static elimination unit, discharged outside through the opening together with the outside air from the air inlet 105, and fed to the user. If the suction detection sensor switch 51 is not turned off by the user (S67), the aerosol is repeatedly ejected every time the suction detection sensor detects the suction within a predetermined period. When the user turns off the suction detection sensor switch 51 or if the suction is not detected for a predetermined period (not shown), the control unit 20 sets the flavor inhaler 101 in a standby state (S62). Alternatively, when the user turns off the power supply, the control unit 20 stops supplying power from the power source (not shown).

Figure 6:
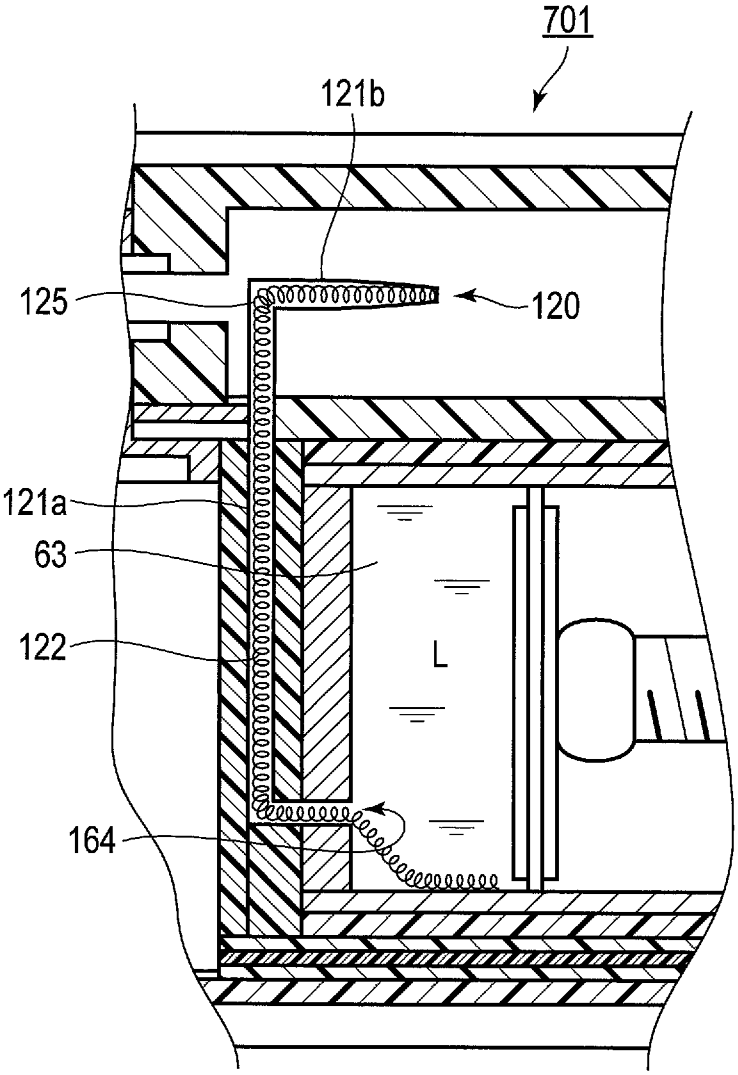
FIG. 6 is an enlarged, partially cross-sectional view illustrating an example of a flavor inhaler according to a third embodiment.

A third embodiment will be described with reference to FIG. 6. A flavor inhaler 701 according to the third embodiment is an example in which the flavor inhaler 101 having chamber 63 shown as an example of the second embodiment further comprises a filler material 125 inside a liquid flow path 122. The filling material 125 may be disposed from the first region 121*a* to the second region 121*b* of the liquid flow path 122.

In the above, a flavor inhaler comprising a liquid holding unit, a liquid flow path, a power source, a supply flow path, and a static elimination unit is shown as some examples of embodiments. However, the flavor inhaler may comprise a plurality of at least one of these within the one housing. Such an example will be shown below.

Figure 7:
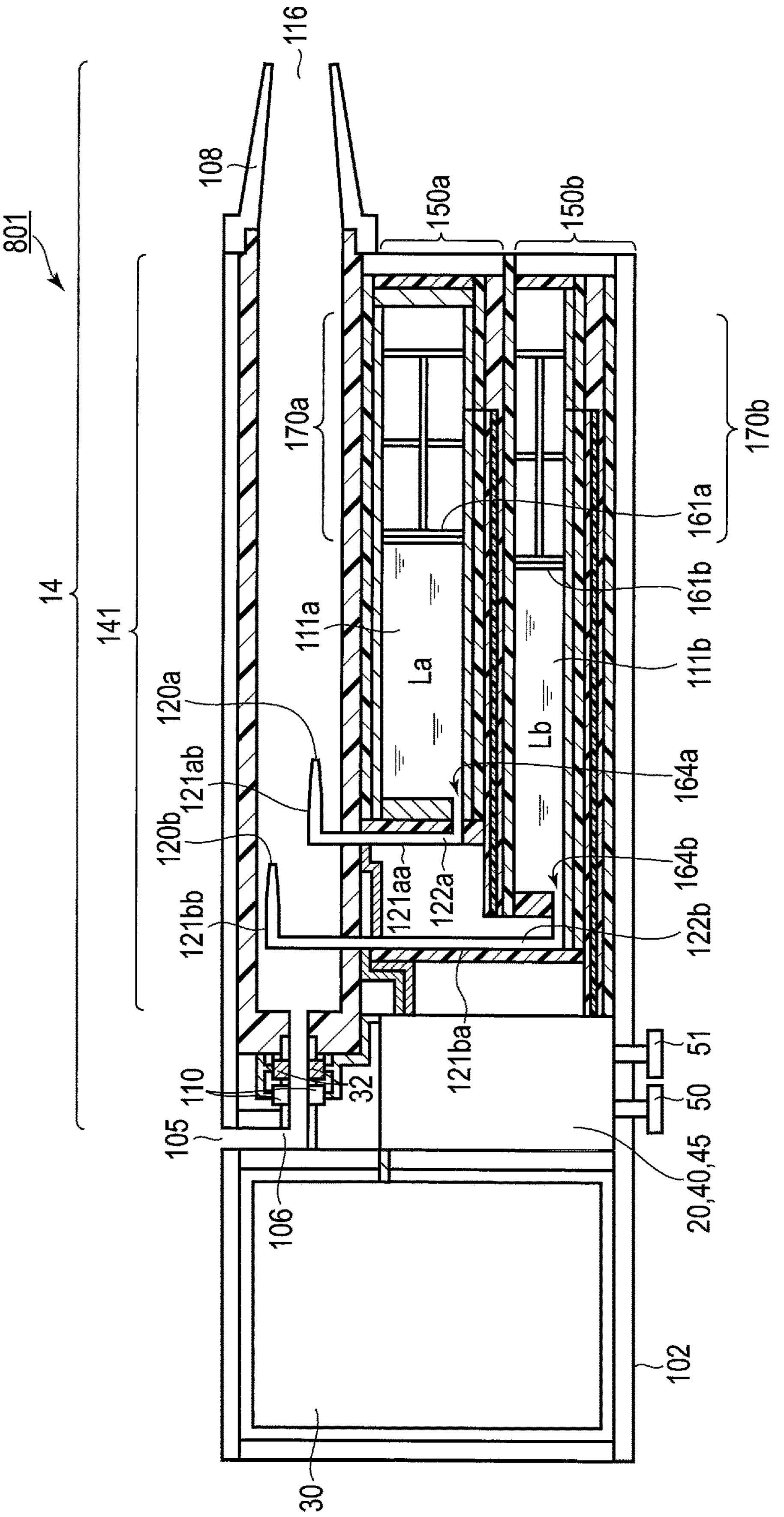
FIG. 7 is a schematically cross-sectional view illustrating an example of a flavor inhaler according to a fourth embodiment.

A fourth embodiment will be described with reference to FIG. 7. A flavor inhaler 801 according to this embodiment comprises two cylinder blocks 150*a* and 150*b* inside a lower casing 103*d*, in the flavor inhaler 101 disclosed as an example of the second embodiment. In the flavor inhaler 801, the first regions 121*aa* and 121*ba* are disposed so as to correspond to the cylinder blocks, which are one-side ends of two liquid flow paths 122*a* and 122*b* composed of extending tube members and communicated with the cylinder blocks. At this time, in one supply flow path 141, two second regions 121*ab* and 121*bb* respectively continuing from the first regions 121*aa* and 121*ba* of the liquid flow paths 122*a* and 122*b* are disposed. Except for such a configuration, the third embodiment has the same configuration and mechanism, or a combination of parts thereof as those of any of the above-described embodiments, and can operate similarly.

Liquids La and Lb stored in the chambers 111*a*, 111*b* of respective cylinder blocks 150*a* and 150*b* may be the same type of aerosol base or different types of aerosol base. The liquids La and Lb are extruded through discharge ports 164*a*, 164*b* by walls 161*a* and 161*b* of syringe pumps 170*a* and 170*b*, respectively.

The voltage application of two cylinder blocks 150*a* and 150*b* for aerosol generation may be controlled separately or controlled at the same time as desired by the control system described above. Alternatively, a further boosting circuit, aerosol generating circuit or a combination thereof for independently controlling the respective cylinder block may be provided in the above control system, which may be controlled by them. These controls performed by the control system may be controlled separately so as to be interlocked with each other or may be controlled so as to be interlocked with a desired time difference or only one of them may be arbitrarily controlled. These control patterns may be preliminarily stored in the control system as specific modes. The applied voltages applied to the second regions 121*ab* and 121*bb* may be set to be opposite to each other in polarity so as to have a static elimination function. In that case, the second region 121*ab* and/or 121*bb* may function as the static elimination unit 32. For example, in such a case, the flavor inhaler 801 does not necessarily need to comprise a static elimination unit in addition to the second region 121*ab* or 121*bb*, but may further comprise a static elimination unit or a part thereof as desired.

In this case, tip ends 120*a* and 120*b* of the liquid flow paths 122*a* and 122*b* may be arranged to face each other so as to facilitate bonding of the particles. The user can select an arbitrary control pattern from a plurality of modes as desired. The ejection of the flavor components from the openings 120*a* and 120*b* of the second regions 121*ab* and 121*bb* communicating with the cylinder blocks respectively, can be performed by the methods and operations described above, or methods and operations obtained by optionally applying or modifying them, and the like.

For example, the flavor inhaler of such an embodiment may comprise the liquid holding unit, the second flow path and the liquid feeding system which correspond to each other as one aerosol generation system. Then, a further flavor inhaler of the embodiment may comprise a plurality of such aerosol generation systems. For example, according to such an embodiment, a plurality of conductive portions, for example, the above-described second region can be disposed in one supply flow path unit, in such a plurality of aerosol generation systems. At least one of such a plurality of conductive portions may provide the static elimination unit.

Figure 8:
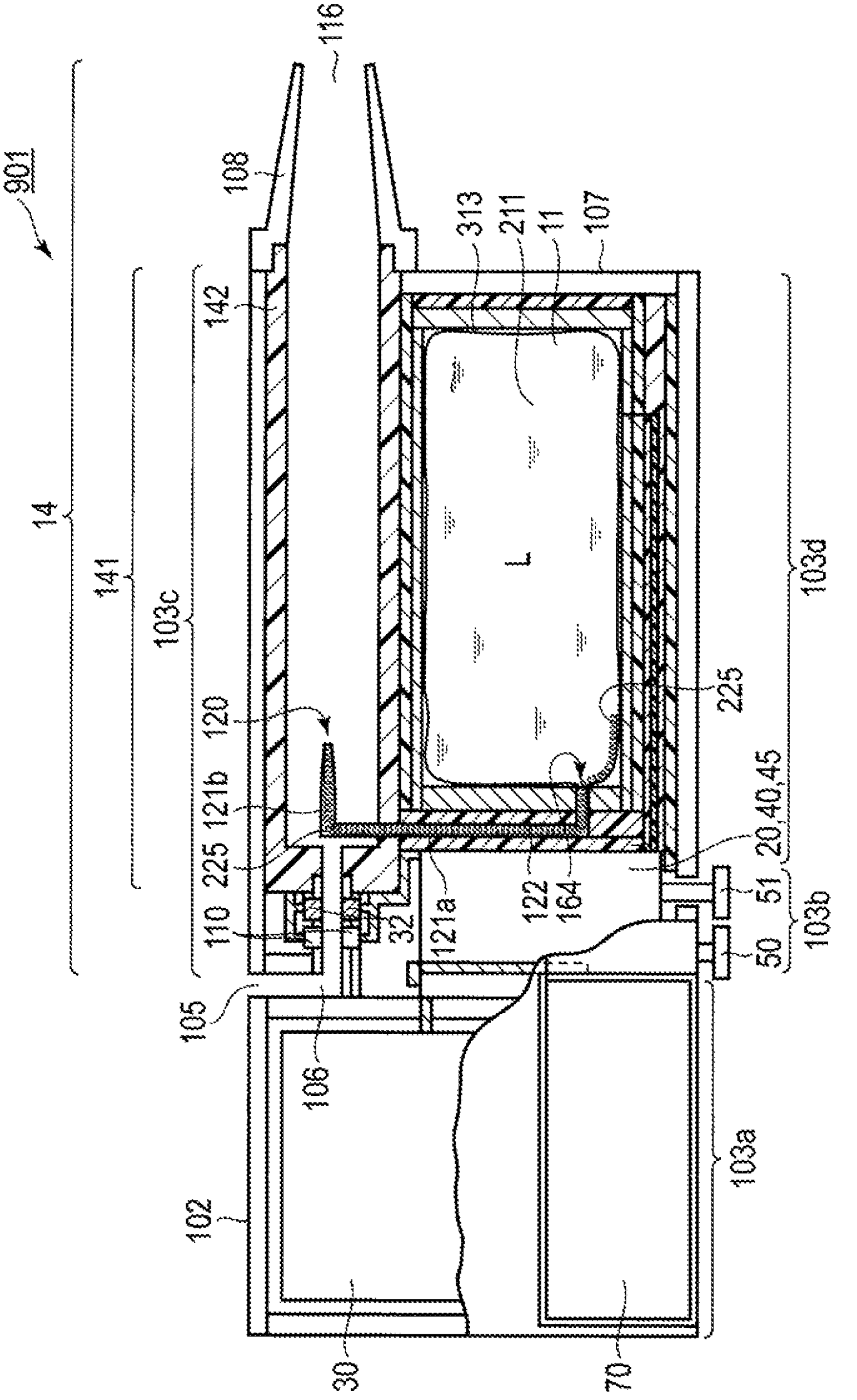
FIG. 8 is a schematically cross-sectional view illustrating an example of a flavor inhaler according to a fifth embodiment.

A fifth embodiment will be described with reference to FIG. 8. In a flavor inhaler 901 according to this embodiment, a lower casing 103*d* is the liquid holding unit 11, and a chamber 211 for accommodating an aerosol base L is disposed therein. The chamber 211 is an insulating liquid-tight container. At a wall portion of the chamber 211 on the side of the intermediate casing 103*b*, an end of the liquid flow path 122 on the side of the first region 121*a* is opened to form a discharge port 164. A flexible bag 313 is accommodated inside the chamber 211, and the aerosol base L is accommodated in the bag 313. The inside of the bag 313 communicates with the discharge port 164, and the aerosol base L accommodated in the bag 313 is fed from the discharge port 164 to the outside. The flavor inhaler 901 comprises a filling material 225 inside the liquid flow path 122 instead of a syringe pump as a liquid feeding system, and the filling material 225 reaches the inside of the bag 313. Due to the capillary phenomenon provided by the filling material 225, the aerosol base is fed to the second region 121*b* via the liquid flow path 122. Except for such a configuration, the flavor inhaler 901 may have the same configuration as the other embodiments described above or a combination of parts thereof. In the other respects, the configuration, operation, usage and the like of the flavor inhaler 901 according to this embodiment can be the same as any one of the embodiments described above or a combination of parts thereof, and the like. In FIG. 8, several parts of the configuration of the flavor inhaler are omitted.

Figure 9:
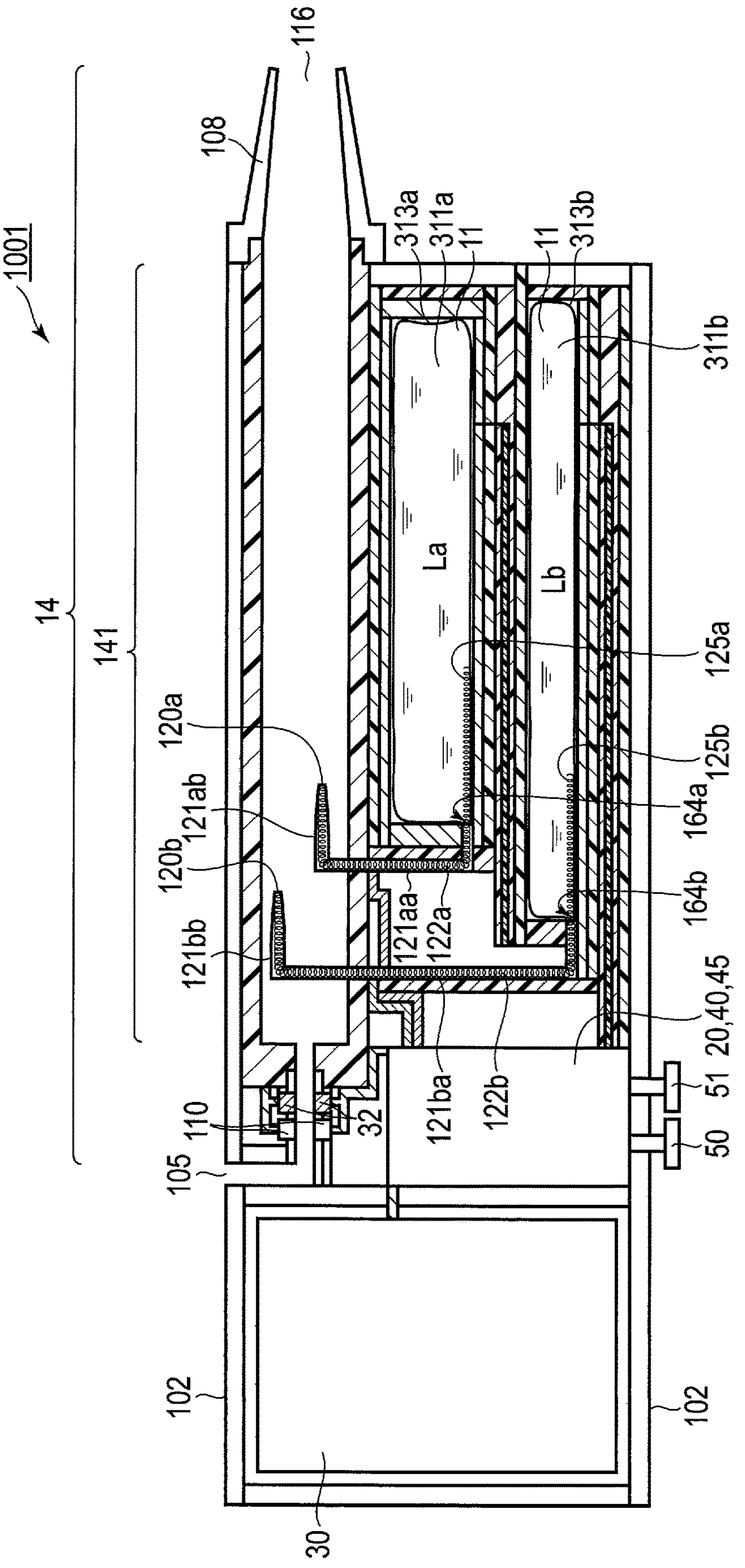
FIG. 9 is a schematically cross-sectional view illustrating an example of a flavor inhaler according to a sixth embodiment.

A sixth embodiment having a pair of liquid holding units 11 will be described with reference to FIG. 9. In a flavor inhaler 1001 according to this embodiment, two chambers 311*a* and 311*b* accommodating aerosol bases La and Lb, respectively, are disposed inside a lower casing 103*d*. In FIG. 9, the chamber 311*a* is disposed above and the chamber 311*b* is disposed below the chamber 311*a*. The first regions 121*aa* and 121*ba*, which are one-end sides of two liquid flow paths 122*a* and 122*b* composed of extending tube members, are arranged from in communication with the chambers 311*a* and 311*b* through discharge ports 164*a*, 164*b* so as to correspond to the chambers. At this time, two second regions 121*ab* and 121*bb* are disposed in one supply flow path 141, which continuous from the respective first regions 121*aa* and 121*ba* of the liquid flow paths 122*a* and 122*b*. Bags 313*a* and 313*b*, and filling materials 125*a* and 125*b* are disposed inside the liquid flow paths 122*a* and 122*b*, respectively. The filling materials 125*a* and 125*b* can be disposed from the first regions 121*aa* and 121*ba* to the second regions 121*ab* and 121*bb* of the liquid flow paths 122*a* and 122*b*, respectively. Except for such a configuration, this embodiment may comprise any of the embodiments described above or a combination of parts thereof. The configuration, operation, and usage of such a flavor inhaler 1001 may be the same as in any of the embodiments described above, or may be a combination of at least a part of any one of the embodiments. Several parts of the configuration of the flavor inhaler are omitted in FIG. 9.

Figure 10:
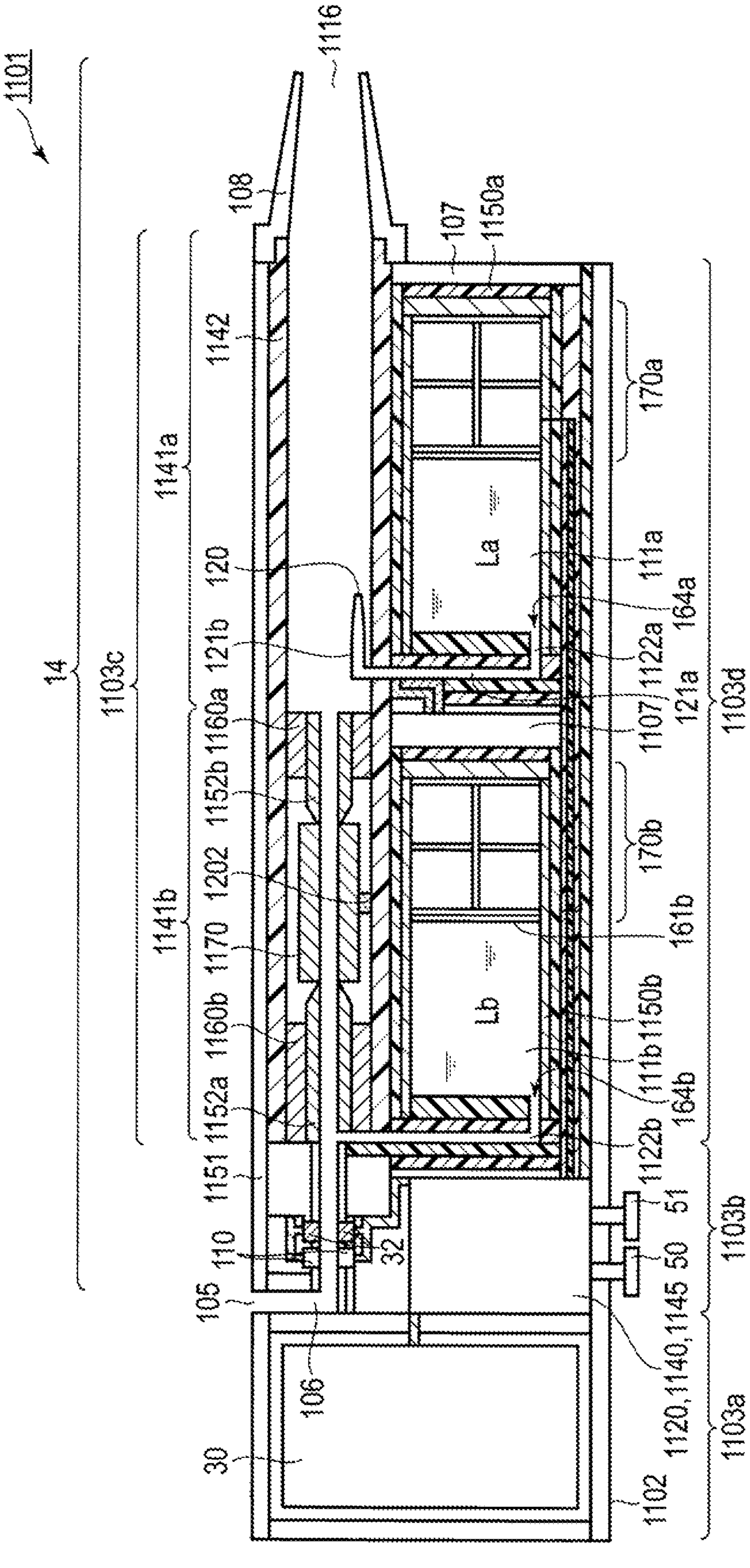
FIG. 10 is a schematically cross-sectional view illustrating an example of a flavor inhaler according to a seventh embodiment.

A seventh embodiment will be described with reference to FIG. 10. A flavor inhaler 1101 according to this embodiment comprises a first aerosol generation system by atomization of an aerosol base by applying high voltage and a second aerosol generation system by heating as disclosed in, for example, JP 5041550 B. One aerosol generation system may include a liquid holding unit, a liquid flow path, a liquid feeding system and aerosol generation mechanism.

The flavor inhaler 1101 comprises a front casing 1103*a*, an intermediate casing 1103*b*, an upper casing 1103*c*, and a lower casing 1103*d* inside a housing 1102.

A power supply 30 is disposed in the front casing 1103*a*. In the intermediate casing 1103*b*, a control system, for example, a control unit 1120 and voltage adjustment circuits 1140 and 1145 are disposed. The power switch 50 and the suction detection sensor switch 51 are electrically connected to control system and are exposed to the outside of the housing 1102. In the upper casing 1103*c*, supply flow paths, that is, 1141*a* and 1141*b* (collectively referred to as "supply flow path 1141") are disposed from the opening portion 1116 side to the front side. The front side of the supply flow path 1141 lead to airway 106, and the other end thereof forms an air inlet 105 which is opened to the outside of the housing 1102. The other end of the supply flow path 1141 is opened at an end wall 107 of the housing 1102. On the end wall 107 corresponding to this opening, a tapered tubular mouthpiece 108 is attached to provide an opening portion 1116.

The voltage adjustment circuit 1140 is electrically connected to a second region 121*b* which is a conductive portion. The voltage adjustment circuit 1145 is electrically connected to a static elimination unit 32.

The static elimination unit 32 comprises a pair of electrodes arranged at positions opposed to each other. Details of the static elimination unit 32 have been described above.

In the supply flow path 1141*a* on the side of the opening portion 1116 of the supply flow path 1141, particles of the flavor component are generated by applying voltage as the above-described configuration and, in the supply flow path 1141*b* on the front side thereof, particles of the flavor component are generated by heating using a heater. These flavor components are discharged from the opening portion 1116 together with the air from the outside taken from the air inlet 105 by the user's suction.

A second region 121*b* of the liquid flow path 1122*a* is disposed inside the supply flow path 1141*a*, and one end thereof has an opening 120. As described above, the second region 121*b* is connected with the first region 121*a* of the liquid flow path 122, and this part is located in the lower casing 1103*d*. The end portion of the first region 121*a* is opened into a chamber 111*a* of the first cylinder block 1150*a* disposed in the lower casing 1103*d* by discharge port 164*a*. The first cylinder block 1150*a* has the same configuration as the above-described cylinder block 150. A liquid aerosol base La is accommodated in the chamber 111*a*.

A second cylinder block 1150*b* is disposed in front of the first cylinder block 1150*a* of the lower casing 1103*d*. The second cylinder block has the same configuration as the above-described cylinder block 150. A liquid aerosol base Lb is accommodated in a chamber 111*b*. The aerosol base Lb may be of the same type as the aerosol base La or may be of a different type.

A partition wall 1107 is disposed between the first cylinder block 1150*a* and the second cylinder block 1150*b*. The first cylinder block 1150*a* and the second cylinder block 1150*b* may be detachable as cartridges. In addition, both the end wall 107 and the partition wall 1107 can be opened and closed.

A wall portion defining the supply flow path 1141 is defined by an insulating wall member 1142. The supply flow path 1141 has a function of a heater chamber 1151 in the supply flow path 1141*b* on the upstream side. Inside the heater chamber 1151, tubular heater holders 1152*a* and 1152*b* supported by respective holder rings 1160*a* and 1160*b* are fixed to the front side and the rear side, respectively. The heater holders 1152*a* and 1152*b* hold a heater 1170 in cooperation by sandwiching the tubular heater 1170 from both the front side and the rear side. An opening for bringing in the aerosol base is formed on the inner surfaces of the heater holders 1152*a* and 1152*b* and the heater 1170, and this opening is connected to the inside of the chamber 111*b* through the liquid flow path 1122*b* which is a tube member through the discharge port 164*b*. A temperature sensor 1202 is disposed on the outer surface of the heater 1170 which detects the temperature of the heater 1170.

Each of the heater 1170 and the temperature sensor 1202 is electrically connected to the control unit. In addition, the heater 1170 is controlled by a heating circuit included in the control system, and temperature rise, temperature maintenance and temperature fall are managed.

The heater 1170 may be formed of a material having conductivity, chemical resistance and heat resistance such as a ceramic heater, stainless steel or the like. In addition, for example, known heater commonly used in electronic cigarettes, may be used.

In the above descriptions, an example of the flavor inhaler comprising the first aerosol generation system atomizing an aerosol base by applying voltage, for example, high voltage, and the second aerosol generation system by heating has been disclosed. However, the configuration of the flavor inhaler comprising a plurality of aerosol generation systems is not limited to such a configuration but, for example, any other aerosol generating device publicly known per se in combination with an aerosol generation system atomizing an aerosol base by applying high voltage can also be used. In addition, the arrangement of such a plurality of aerosol generation systems is not limited to the arrangement on the upstream side and the downstream side, respectively, as described above, but a plurality of aerosol generation systems may be arranged parallel so as to be in parallel with the axis of the supply flow path unit. Alternatively, a plurality of, for example, two aerosol generation systems arranged in the flavor inhaler may comprise supply flow paths independent of each other. In this case, the emissions supplied from them can be fed to the user from one suction port. Furthermore, the number of aerosol generation systems included in one flavor inhaler is not limited to two, but may be two or more.

The control of a plurality of the aerosol generation systems can be carried out similarly to any of the embodiments described above or a combination of at least a part thereof.

Plural examples have been disclosed in the above descriptions. According to the flavor inhaler of the embodiments, a particle group of the flavor components having desired particle sizes independently or in combination as particles can be provided. For example, the particle diameter is adjusted, selected, and provided independently or in combination within a range of 0.1 μm to 10 μm, for example, 10 μm to 100 μm by a volume-based median diameter. The volume-based median diameter is evaluated from the particle diameter distribution of sphere equivalent diameter obtained by the light scattering method using laser light. When the user inhaling aerosol, it is known that particles having a volume-based median diameter of 10 μm to 100 μm are deposited in the oral cavity, and by selecting this particle size, a taste component can be stably supplied into the oral cavity and fixed. Thereby, taste providing can be achieved effectively.

In the above embodiments, the adjustment of the particle size of the formed aerosol can be carried out by, for example, adjusting the voltage, the electric conductivity and/or the viscosity and/or the surface tension of the solution, and/or adjusting mixture with airflow and the like, thereby adjusting the degree of evaporation or the like. Thereby the flavor components of particles having different particle size and/or distribution can be formed.

The flavor inhaler according to the embodiments can form particles of the flavor components as desired whether the flavor components are volatile components or nonvolatile components. In addition, aerosol can be generated similarly with the aerosol base having a low viscosity or having some viscosity. For example, by including aerosol bases having different viscosities in a plurality of aerosol generation systems, respectively, the particle diameters of aerosols thereby formed can be made different from one another.

For example, the conductivity of the solution can be changed by adding a substance which ionizes and dissolves in an aqueous solution. Examples of such additives may be food additives and the like. Representative examples of such additives are disclosed below, but the conductivity can be adjusted as long as the additive is a component ionized in an aqueous solution, and the additives are not limited to these components: inorganic salts such as potassium chloride and sodium chloride, organic acids such as adipic acid, citric acid, gluconic acid, tartaric acid, lactic acid, acetic acid, fumaric acid, malic acid, succinic acid and sorbic acid, organic acid salts such as phosphoric acid and amino acids, monopotassium citrate, trisodium citrate, sodium L-glutamate, potassium L-glutamate, magnesium L-glutamate, sodium succinate, sodium tartrate, potassium hydrogen tartrate, sodium lactate, disodium glycyrrhizic acid and potassium sorbate, and the like.

Furthermore, in any of the above-described embodiments, the range of particle distribution can be extended by providing a plurality of liquid flow paths and/or openings of the second region for one liquid holding unit and constituting a control system to apply a voltage to each of them independently. Delivery to a number of desired sites can be thereby carried out, and a change of flavor can be achieved. In this case, by branching one liquid flow path into two parts, two of the second regions may be provided.

Furthermore, in the case of the flavor inhaler comprising a plurality of aerosol generation systems, the particle diameters or distributions of the aerosols to be formed by these aerosol generation systems can be made different from each other. In this case, adjustment of the particle diameters of the aerosol as described above may be carried out, respectively. If the electric conductivity and/or the viscosity and/or the surface tension of the solution to be the aerosol base are made different from each other, not only a plurality of the aerosol generation systems, but a plurality of liquid holding units corresponding thereto may be disposed. Thereby, aerosol of particles having different particle sizes and/or distributions can be formed in one flavor inhaler. Such aerosols having properties different from each other can be provided to the user, at the same time, over time, or with a time lag. Such providing may be accomplished by preprogramming the control unit and/or by the user selecting from such preprogrammed menu. Moreover, various flavors and components can be thereby provided to a desired site according to the user's preference, mood and/or environment.

In addition, in the aerosol generating systems of the embodiments, desired charges can be supplied to the particles of the flavor components or particles subjected to static elimination can be formed by changing and/or adjusting the applied voltage polarity. In addition, if a plurality of the aerosol generation units is used, the pattern or the magnitude of the voltage, the application time, the positive or negative polarity of the charges and the degree thereof, or the combination of any of them may be equal or different from each other in the aerosol generation systems.

The flavor inhaler according to the embodiments can reduce the area or volume required to produce the aerosol, thereby allowing miniaturization.

At least parts of any of the above-described embodiments may be further combined in other embodiments and at least parts of any of the above-described embodiments may be omitted similarly to the configurations of the other embodiments. Such flavor inhalers are further embodiments of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flavor inhaler, comprising:

a suction port;

a control unit configured to control operation of the flavor inhaler;

a main switch electrically connected to an input side of the control unit, the main switch configured to send a signal to the control unit to start operation of the control unit;

a suction detection sensor electrically connected to an input side of the control unit; and a sub switch electrically connected to an input side of the control unit, wherein activation of the sub switch causes the control unit to activate the suction detection sensor, wherein the suction detection sensor is configured to send a signal to the control unit to start supplying liquid from a liquid holding unit accommodating an aerosol base when the suction detection sensor detects suction through the suction port.

2. The flavor inhaler according to claim 1, further comprising a power supply electrically connected to at least one of the input side of the control unit and an output side of the control unit.

3. The flavor inhaler according to claim 2, wherein the power supply is electrically connected to the input side of the control unit, and wherein activation of the main switch by a user causes the power supply to supply electric power to the control unit.

4. The flavor inhaler according to claim 2, wherein the power supply is electrically connected to the output side of the control unit such that the control unit controls electric power supplied by the power supply.

5. The flavor inhaler according to claim 1, wherein the main switch is a power switch.

6. The flavor inhaler according to claim 1, wherein the control unit comprises a microprocessor and a memory.

7. The flavor inhaler according to claim 1, further comprising a casing configured to mount a cartridge comprising the liquid holding unit that accommodates an aerosol base.

8. The flavor inhaler according to claim 7, wherein the cartridge further comprises a liquid feeding system configured to connect the aerosol base in the liquid holding unit to a liquid flow path.

9. The flavor inhaler according to claim 8, wherein the liquid feeding system comprises a filling material arranged to connect the aerosol base in the liquid holding unit to the liquid flow path by capillarity.

10. The flavor inhaler according to claim 9, wherein the filling material is a fibrous material.

11. The flavor inhaler according to claim 8, wherein the liquid feeding system comprises a feeding mechanism.

12. The flavor inhaler according to claim 11, wherein the feeding mechanism is a syringe pump.

13. The flavor inhaler according to claim 7, further comprising a cartridge detection sensor configured to detect the mounting of the cartridge in the casing, wherein the cartridge detection sensor is electrically connected to the input side of the control unit, wherein the cartridge detection sensor is configured to transmit information about the mounting of the cartridge to the control unit, and wherein the control unit is further configured to control operation of the flavor inhaler based on the information received from the cartridge detection sensor.

14. The flavor inhaler according to claim 1, further comprising a remaining amount sensor configured to sense the remaining amount of aerosol base, wherein the remaining amount sensor is electrically connected to the input side of the control unit, wherein the remaining amount sensor is configured to transmit information about the remaining amount of aerosol base to the control unit, and wherein the control unit is further configured to control operation of the flavor inhaler based on the information received from the remaining amount sensor.

15. The flavor inhaler according to claim 1, further comprising a temperature sensor electrically connected to the input side of the control unit, wherein the temperature sensor is configured to transmit temperature information to the control unit, and wherein the control unit is further configured to control operation of the flavor inhaler based on the information received from the temperature sensor.

* * * * *